(12) United States Patent
Wang (10) Patent No.: US 11,387,616 B2
(45) Date of Patent: Jul. 12, 2022

(54) RADIO FREQUENCY CONNECTOR AND TERMINAL

(71) Applicant: BEIJING XIAOMI MOBILE SOFTWARE CO., LTD., Beijing (CN)

(72) Inventor: Wei Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/953,911

(22) Filed: Nov. 20, 2020

(65) Prior Publication Data
US 2021/0408747 A1   Dec. 30, 2021

(30) Foreign Application Priority Data

Jun. 30, 2020   (CN) .......................... 202010623436.1

(51) Int. Cl.
*H01R 35/04*   (2006.01)
*H01R 13/6581*   (2011.01)
*H04M 1/02*   (2006.01)

(52) U.S. Cl.
CPC ......... *H01R 35/04* (2013.01); *H01R 13/6581* (2013.01); *H04M 1/0216* (2013.01)

(58) Field of Classification Search
None
See application file for complete search history.

(56) References Cited

U.S. PATENT DOCUMENTS

| | | | |
|---|---|---|---|
| 3,860,312 A | 1/1975 | Gordon, Jr. | |
| 5,395,248 A * | 3/1995 | Kinoshita | .............. H01R 35/04 439/31 |
| 6,272,324 B1 * | 8/2001 | Rudisill | .............. H04M 1/0216 455/575.8 |
| 6,484,016 B1 * | 11/2002 | Cheon | ................. H04M 1/0216 455/90.1 |
| 6,700,784 B2 * | 3/2004 | Huang | .................. G06F 1/1616 361/715 |

(Continued)

FOREIGN PATENT DOCUMENTS

CN   104506688 A   4/2015

OTHER PUBLICATIONS

European Search Report in the European application No. 20211458. 3, dated May 21, 2021, 8 pgs.

*Primary Examiner* — Oscar C Jimenez
(74) *Attorney, Agent, or Firm* — Cooper Legal Group, LLC (57) ABSTRACT

The present disclosure relates to a Radio Frequency (RF) connector and a terminal. The RF connector includes: a rotation shaft which includes a first connection contact and a second connection contact, the first connection contact and the second connection contact forming rotation shaft structures which are rotatable relative to each other, and the first connection contact and the second connection contact forming an electrical connection; a first connection wire, which is connected with the first connection contact; and a second connection wire, which is connected with the second connection contact. By rotationally connecting two connection wires through an RF connector, an antenna of a first part in a foldable terminal is connected to a motherboard of a second part in the foldable terminal, or the antenna of the second part in the foldable terminal is connected to the motherboard of the first part in the foldable terminal.

14 Claims, 5 Drawing Sheets

(56) References Cited

U.S. PATENT DOCUMENTS

| | | | |
|---|---|---|---|
| 7,094,084 B2* | 8/2006 | Lee | H04M 1/0216 |
| | | | 439/165 |
| 7,097,479 B2* | 8/2006 | Lee | G06F 1/1616 |
| | | | 439/165 |
| 8,070,494 B2* | 12/2011 | Li | H01R 39/64 |
| | | | 439/26 |
| 2004/0038719 A1 | 2/2004 | Lee | |
| 2005/0097707 A1* | 5/2005 | Ibaraki | H01H 3/162 |
| | | | 16/342 |
| 2005/0213307 A1 | 9/2005 | Pan | |
| 2017/0201607 A1 | 7/2017 | Xu | |

* cited by examiner

RADIO FREQUENCY CONNECTOR AND TERMINAL

CROSS-REFERENCE TO RELATED APPLICATIONS

The present application is based upon and claims priority to Chinese Patent Application No. 202010623436.1, filed on Jun. 30, 2020, the entire contents of which are incorporated herein by reference.

TECHNICAL FIELD

The present disclosure relates to the field of machinery, and more particularly, to a Radio Frequency (RF) connector and a terminal.

BACKGROUND

Taking mobile phones as an example, with the development of 5G (5th generation wireless systems) technology, the terminal being able to support the 5G technology will become a "standard configuration" of the mobile phones, which requires the mobile phones to use the frame to arrange as many antennas as possible, thus supporting the 5G technology. With the increasing maturity of flexible screen technology, foldable mobile phones are attracting more and more attention from consumers. Therefore, how to arrange more antennas in the foldable mobile phones to adapt to the 5G technology is becoming one of the urgent problems to be solved.

Generally, a foldable mobile phone includes two foldable components. The motherboard is only located on one of the two foldable components, and the antenna and the switches related to the antenna are arranged on the foldable component with the motherboard. In order to arrange more antennas, it is necessary to design antennas on both of the two foldable components, but an antenna radiator on the foldable component without the motherboard needs to be connected to the motherboard through a connection wire, which must pass through a folding position. Most of the available connection wires cannot be bent at a large angle multiple times. Therefore, at present, the antenna of the foldable mobile phone is only designed on the foldable component with the motherboard, which is a relatively large limitation to the design of the antenna.

SUMMARY

The present disclosure provides an RF connector and a terminal for a rotary connection of connection wires.

According to a first aspect of embodiments of the present disclosure, an RF connector is provided, which may include: a rotation shaft, a first connection wire and a second connection wire.

The rotation shaft includes a first connection contact and a second connection contact. The first connection contact and the second connection contact form rotation shaft structures which are rotatable relative to each other, and the first connection contact and the second connection contact form an electrical connection.

The first connection wire is connected with the first connection contact.

The second connection wire is connected with the second connection contact.

According to a second aspect of the embodiments of the present disclosure, a terminal is provided, which includes the RF connector in any of above embodiments.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same reference numerals in different drawings represent the same or similar elements unless otherwise represented. The implementations set forth in the following description of exemplary embodiments do not represent all implementations consistent with the present disclosure. Instead, they are merely examples of devices consistent with aspects related to the present disclosure as recited in the appended claims.

In the descriptions of the present disclosure, it is to be understood that orientation or position relationships indicated by terms "center", "upper", "lower", "top", "bottom", "inner", "outer" and the like are based on the orientation or position relationships shown in the accompanying drawings.

The embodiments of the present disclosure provide an RF connector 10. The RF connector 10 includes a rotation shaft 100, a first connection wire 200 and a second connection wire 300.

The rotation shaft 100 includes a first connection contact 110 and a second connection contact 160. The first connection contact 110 and the second connection contact 160 form rotation shaft structures which are rotatable relative to each other, and the first connection contact 110 and the second connection contact 160 form an electrical connection.

The first connection wire 200 is connected with the first connection contact 110.

The second connection wire 300 is connected with the second connection contact 160.

In the embodiments of the present disclosure, when the first connection contact 110 rotates with respect to the second connection contact 160, the first connection wire 200 and the second connection wire 300 are driven into rotation. By using two connection wires 200, 300 of the RF connector 10 to connect an antenna and an RF circuit of the antenna and rotationally connecting the two connection wires 200, 300 through the rotation shaft 100, the antenna of a first part in a foldable terminal is connected to a motherboard of a second part, or the antenna of the second part in the foldable terminal is connected to the motherboard of the first part. Therefore, when the RF connector 10 is used in the foldable terminal, in the case that both the first part and the second part of the foldable terminal are provided with the antenna, there is no need to fold the first connection wire 200 or the second connection wire 300 during the movement of the foldable terminal to a folding position.

Both the first connection contact 110 and the second connection contact 160 are electrically conductive. The first connection contact 110 and the second connection contact 160 come into contact with each other to form the electrical connection inside the RF connector 10. The structure of rotation shaft 100 formed by the first connection contact 110 and the second connection contact 160 enables the first connection contact 110 and the second connection contact 160 to maintain the electrical connection no matter how the rotation shaft 100 rotates. Compared with the existing RF connector, the embodiments of the present disclosure change only relative contacting positions of the first connection contact 110 and the second connection contact 160 through such an arrangement, but do not change conductive parameters (such as impedance, working frequency or transmission power and the like) of the RF connector as a connector.

In other optional embodiments, the rotation shaft 100 may further include a rotation shaft body 120.

The first connection contact 110 is arranged on a first rotating member 121 of the rotation shaft body 120, and the second connection contact 160 is arranged on a second rotating member 122 of the rotation shaft body 120.

When the first rotating member 121 rotates with respect to the second rotating member 122, the first connection contact 110 and the second connection contact 160 are driven into rotation relative to each other. The rotation shaft body 120 may be configured to support the first connection contact 110 and the second connection contact 160 and to assist the rotation of the first connection contact 110 and the second connection contact 160. When the RF connector 10 is used in the foldable terminal, the rotation shaft body 120 may also drive the first part and the second part of the foldable terminal into rotation to ensure smooth folding of the foldable terminal.

In practical applications, the rotation shaft body 120 may be a gemel or a hinge. Both the first rotating member 121 and the second rotating member 122 may be made of metal or alloy with good strength and fatigue resistance.

At least at the position where the first rotating member 121 and the second rotating member 122 are connected, the first rotating member 121 and the second rotating member 122 are cylindrical or circular, so that the first rotating member 121 and the second rotating member 122 are rotatable relative to each other.

Figure 1:
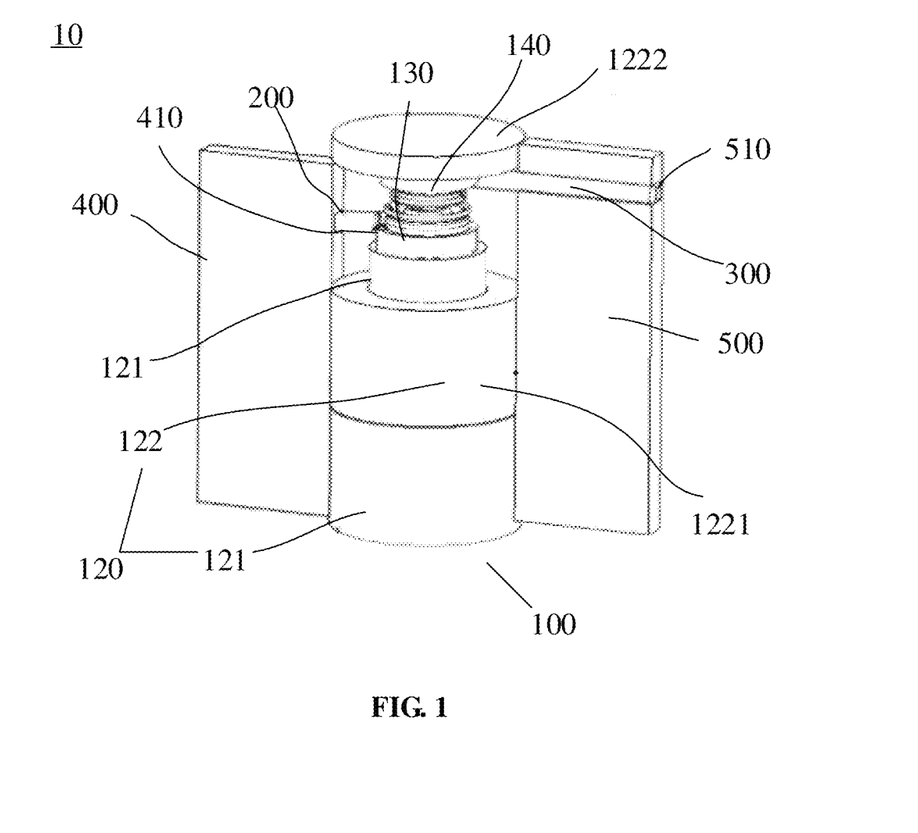
FIG. 1 is a local diagram of a terminal according to some embodiments of the disclosure.

Unrestrictedly, as shown in FIG. 1, one of the first rotating member 121 and the second rotating member 122 may be a shaft sleeve, and the other one of the first rotating member 121 and the second rotating member 122 may be a shaft core. The shaft core and the shaft sleeve are arranged coaxially. The shaft sleeve of the rotation shaft 100 has a circular through hole arranged along the axis direction of the shaft sleeve, and the shaft core includes a cylindrical part. The cylindrical part of the shaft core passes through the circular through hole and rotates with respect to the shaft sleeve through the circular through hole. The maximum relative rotation angle between the first rotating member 121 and the second rotating member 122 may be up to 360 degrees. A relative rotation angle between the first connection contact 110 and the second connection contact 160 may be the same as the relative rotation angle between the first rotating member 121 and the second rotating member 122, and then the maximum rotation angle between the first connection wire 200 and the second connection wire 300 may also be up to 360 degrees, which realizes a large angle rotation between the first connection wire 200 and the second connection wire 300.

In other optional embodiments, the rotation shaft 100 may further include a shielding shell.

Both the first connection contact 110 and the second connection contact 160 are located in the shielding shell.

Through the connection between the first connection contact 110 and the second connection contact 160, the connection inside the RF connector 10 may be formed to ensure the transmission of an antenna signal. The shielding shell may shield the antenna signal and improve the quality and stability of the antenna signal.

The shielding shell may be an integrated structure. In this case, the shielding shell may be fixed only outside the first connection contact 110 or outside the second connection contact 160. When the first connection contact 110 and the second connection contact 160 are connected, both the first connection contact 110 and the second connection contact 160 are located in the shield shell.

Or, in other optional embodiments, the shielding shell may be a structure with two parts which are separable from each other and include a first shielding shell 130 and a second shielding shell 140. Specifically, the first shielding shell 130 is arranged outside the first connection contact 110, the second shielding shell 140 is arranged outside the second connection contact 160, the first shielding shell 130 and the second shielding shell 140 jointly form an accommodating space, and both the first connection contact 110 and the second connection contact 160 are located in the accommodating space.

As shown in FIG. 1, the first shielding shell 130 and the second shielding shell 140 are closely connected and may rotate with the relative rotation between the first connection contact 110 and the second connection contact 160. In order not to affect the relative rotation between the first shielding shell 130 and the second shielding shell 140, both the first shielding shell 130 and the second shielding shell 140 have a round or arched mating surface at least at the position where the first shielding shell 130 and the second shielding shell 140 are connected.

Figure 2:
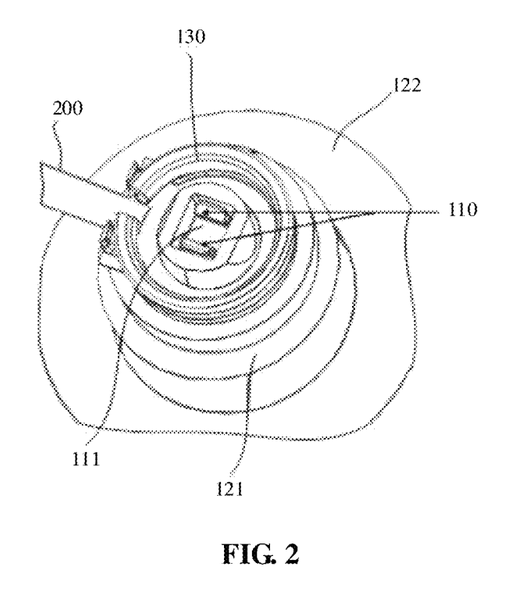
FIG. 2 is a local diagram of an RF connector according to some embodiments of the disclosure.
Figure 3:
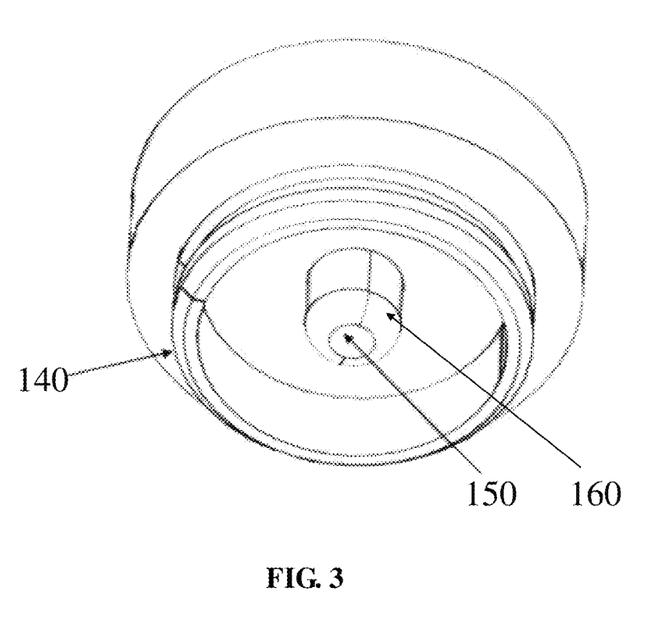
FIG. 3 is another local diagram of an RF connector according to some embodiments of the disclosure.

As shown in FIG. 1 to FIG. 3, when the rotation shaft 100 includes the rotation shaft body 120, the first connection contact 110 is connected to the first rotating member 121 through the first shielding shell 130, and the second connection contact 160 is connected to the second rotating member 122 through the second shielding shell 140. The first rotating member 121 and the second rotating member 122 can rotate synchronously, the first connection contact 110 and the second connection contact 160 can rotate synchronously, and the first shielding shell 130 and the second shielding shell 140 can rotate synchronously. No matter how the rotation shaft body 120 rotates, the first connection contact 110 and the second connection contact 160 remain electrically connected.

Optionally, the first connection contact 110, the second connection contact 160, the first shielding shell 130 and the second shielding shell 140 may be made of conductor materials such as metal or alloy and the like, such as copper, stainless steel, gold-plated copper, silver-plated copper or nickel-plated copper.

In other optional embodiments, the first connection contact 110 includes a connection bayonet 111.

The second connection contact 160 includes a connection inner core 150.

The connection inner core 150 is inserted in the connection bayonet 111.

In practical applications, the connection inner core 150 may be coaxial with the connection bayonet 111, and the connection inner core 150 may be coaxial with the rotation shaft body 120. The connection inner core 150 is rotatable in the connection bayonet 111.

Unrestrictedly, the connection inner core 150 is cylindrical.

In addition to being cylindrical, the connection core 150 may also be conical or frustum-shaped.

In addition, the first connection contact 110 and the second connection contact 160 may also be in other forms such as golden finger or bonding pad. The first connection contact 110 here may be a joint name of one or more connection contacts; similarly, the second connection contact 160 may also be a joint name of one or more connection contacts. If there are multiple first connection contacts 110, the multiple first connection contacts are arranged in parallel. If there are multiple second connection contacts 160, the multiple second connection contacts 160 are arranged in parallel.

In other optional embodiments, the first connection wire 200 includes coaxial wire, flexible printed circuit (FPC) wire, polyimide (PI) wire or liquid crystal polymer (LCP) wire.

The second connection wire 300 includes coaxial wire, FPC wire, PI wire or LCP wire.

The coaxial wire, FPC wire, PI wire and LCP wire refer to signal transmission carriers using different kinds of base materials. The FPC wire refers to flexible printed circuit. The PI wire refers to a transmission wire using polyimide as the base material, and the LCP wire refers to a transmission wire using liquid crystal polymer as the base material.

In a specific embodiment, taking the coaxial wire, namely a coaxial cable, as an example, the coaxial cable generally includes a conductor core at the center of the coaxial cable and a shell coaxially surrounding the conductor core. The shell has a shielding effect on the conductor core to ensure the quality and stability of signal transmission of the conductor core. The conductor core of the coaxial cable used as the first connection wire 200 is connected with the first connection contact 110, and the shell of the coaxial cable used as the first connection wire 200 is connected with the first shielding shell 130. Similarly, the conductor core of the coaxial cable used as the second connection wire 300 is connected with the second connection contact 160, and the shell of the coaxial cable used as the second connection wire 300 is connected with the second shielding shell 140.

The embodiments of the present disclosure also provide a terminal 20, which includes the RF connector 10 in any of the above embodiments.

The terminal 20 is foldable and includes a first part and a second part which are foldable relative to each other. The terminal 20 may be a foldable terminal, for example, a foldable mobile phone, a foldable TV or a foldable tablet computer. The terminal 20 may also be an electronic product like a laptop, including a display screen and a keyboard which are rotatable relative to each other. One of the first connection wire 200 and the second connection wire 300 may be located on the first part of the terminal 20, and the other of the first connection wire 200 and the second connection wire 300 may be located on the second part of the terminal 20. That is to say, the two foldable parts of the terminal 20 may be used as a carrier of the antenna. For the laptop and other electronic products, the display screen and keyboard may be folded or unfolded.

In other optional embodiments, the rotation shaft 100 may further include the rotation shaft body 120.

The first connection contact 110 is arranged on the first rotating member 121 of the rotation shaft body 120, and the second connection contact 160 is arranged on the second rotating member 122 of the rotation shaft body 120.

The first rotating member 121 is connected to a first support plate 400 of the terminal 20, and the second rotating member 122 is connected to a second support plate 500 of the terminal 20. The first rotating member 121 and the second rotating member 122 drive the first support plate 400 and the second support plate 500 into rotation.

The first part of the terminal 20 includes the first support plate 400, and the second part of the terminal 20 includes the second support plate 500. The first support plate 400 and the second support plate 500 rotate with the rotation of the first rotating member 121 and the second rotating member 122, thus realizing the folding of the first part and the second part of the terminal 20.

Unrestrictedly, as shown in FIG. 1, the second rotating member 122 includes an upper part 1222 and a lower part 1221. The lower part 1221 is connected with the first rotating member 121, and the upper part 1222 is connected with the top of the second shielding shell 140. The second support plate 500 is connected with the upper part 1222 and the lower part 1221 of the second rotating member 122, so that the two parts 1221, 1222 of the second rotating member 122 are integral. The bottom of the first shielding shell 130 is connected with the first rotating member 121, and the first shielding shell 130 is of a cylindrical shape with an opening facing up. The second shielding shell 140 is of a cylindrical shape with an opening facing down and is coaxial with the first shielding shell 130. When the first connection contact 110 and the second connection contact 160 are connected, the first shielding shell 130 and the second shielding shell 140 are closely connected. Such a structure further ensures that the first rotating member 121 and the second rotating member 122 may rotate synchronously, the first connection contact 110 and the second connection contact 160 may rotate synchronously, and the first shielding shell 130 and the second shielding shell 140 may rotate synchronously.

In other optional embodiments, the first support plate 400 includes a first groove 410, and the first connection wire 200 is arranged in the first groove 410.

The second support plate 500 includes a second groove 510, and the second connection wire 300 is arranged in the second groove 510.

Generally, the first support plate 400 accommodates the first connection wire 200 through the first groove 410, and the second support plate 500 accommodates the second connection wire 300 through the second groove 510.

As shown in FIG. 1, the shape of the first connection wire 200 matches the shape of the inner surface of the first groove 410, that is, the first connection wire 200 is conformal with the first groove 410. The shape of the second connection wire 300 matches the shape of the inner surface of the second groove 510, that is, the second connection wire 300 is conformal with the second groove 510. This conformal design makes the shapes of the first connection wire 200 and the first support plate 400 consistent, or makes the shapes of the second connection wire 300 and the second support plate 500 consistent, which improves the integrity, reduces the occupation of the connection wire 200, 300 to the inner space of the terminal 20, and reduces the interference of the connection wire 200, 300 to other structures in the terminal 20.

In other optional embodiments, the first connection wire 200 is connected to an antenna 600, and the second connection wire 300 is connected to an RF module 700.

Or, the first connection wire 200 is connected to an RF module 700, and the second connection wire 300 is connected to an antenna 600.

Generally, the RF module 700 is arranged on the first part or the second part of the terminal 20. When the RF module 700 is arranged on the first part, the first connection wire 200 may be directly connected with the RF module 700, and the second connection wire 300 arranged on the second part is electrically connected with the first connection wire 200 through the rotation shaft 100 to realize signal transmission. Similarly, when the RF module 700 is arranged on the second part, the second connection wire 300 may be directly connected with the RF module 700, and the first connection wire 200 arranged on the first part of the terminal 20 is electrically connected with the second connection wire 300 through the rotation shaft 100 to realize signal transmission.

Figure 4:
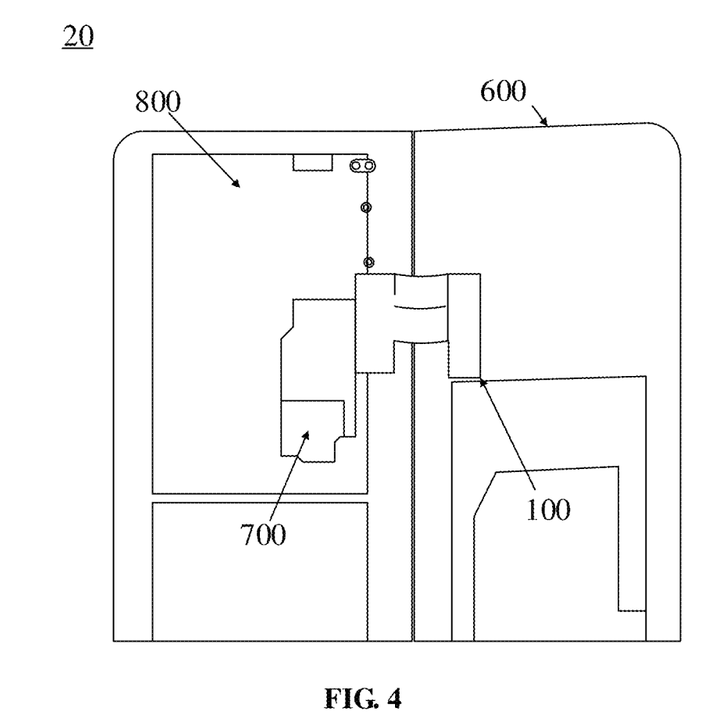
FIG. 4 is a schematic diagram showing an antenna, an RF module and a motherboard of a terminal according to some embodiments of the disclosure.

Generally, the RF module 700 is arranged on a motherboard 800, as shown in FIG. 4. The motherboard 800 further includes a baseband module in communication connection with the RF module 700.

Figure 5:
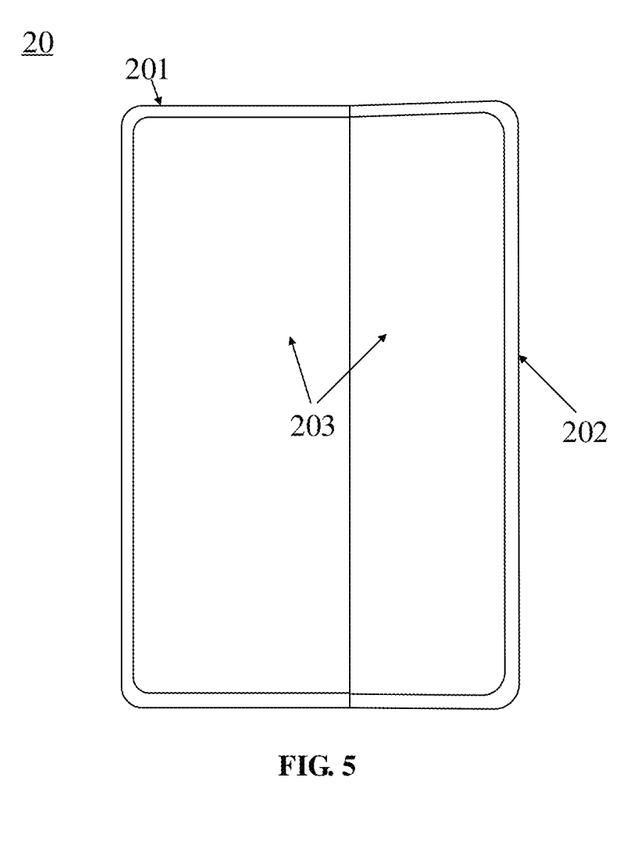
FIG. 5 is a schematic diagram showing a first shell, a second shell and a flexible screen of a terminal according to some embodiments of the disclosure.

In other optional embodiments, as shown in FIG. 5, the terminal 20 may further include a first shell 201, a second shell 202 and a flexible screen 203.

The first shell 201 is connected with the first rotating member 121 and/or the first support plate 400. The first connection wire 200 is located in the first shell 201.

The second shell 202 is connected with the second rotating member 122 and/or the second support plate 500. The second connection wire 300 is located in the second shell 202.

The back of the flexible screen 203 is covered on the first shell 201, the second shell 202 and the rotation shaft 100, and the flexible screen 203 deforms with the rotation of the first shell 201 with respect to the second shell 202.

The first part of the terminal 20 includes the first shell 201, and the second part of the terminal 20 includes the second shell 202. The flexible screen 203 is a foldable display screen. For example, the flexible screen 203 is a flexible Organic Light-Emitting Diode (OLED) screen. Under the action of the first shell 201 and the second shell 202, the flexible screen 203 is folded or unfolded. Folding includes a state of inward folding, in which the flexible screen 203 may be folded inward; at this point, the first shell 201 and the second shell 202 are located on the outside, which may protect the flexible screen 203. In addition, inward folding may also reduce the space occupied by the terminal 20 and facilitate the storage of the terminal 20. Folding further includes a state of outward folding, in which the flexible screen 203 is folded into two parts opposite to each other around the rotation shaft 100; at this point, the two parts of the flexible screen 203 may display different information for two opposite people to use at the same time. When the two parts of the flexible screen 203 are unfolded, a large screen effect may be obtained.

In other optional embodiments, the first shell 201 is integral with the first support plate 400, or the first shell 201 is separable from the first support plate 400.

The second shell 202 is integral with the second support plate 500, or the second shell 202 is separable from the second support plate 500.

When the integral structure is used, the risk of unreliability when the first support plate 400 is connected with the first shell 201 and the risk of unreliability when the second support plate 500 is connected with the second shell 202 may be reduced. In particular, by means of machining or molding, the first shell 201 and the first support plate 400 may be integrally formed, and the second shell 202 and the second support plate 500 may be integrally formed.

When the separable structure is used, the first support plate 400 and the first shell 201 may be arranged in parallel or in contact with each other, and the second support plate 500 and the second shell 202 may be arranged in parallel or in contact with each other to minimize the increase of terminal 20 thickness due to the arrangement of the first support plate 400 and the second support plate 500 on the basis of improving the integrity of the first support plate 400 and the first shell 201 and the integrity of the second support plate 500 and the second shell 202.

The first shell 201 may be integral with the second shell 202. Specifically, the part between the first shell 201 and the second shell 202 is a flexible part, which corresponds to the rotation shaft 100. When an external force in a preset direction is applied to the first shell 201 and/or the second shell 202, the flexible part deforms, the first rotating member 121 and the second rotating member 122 rotate relative to each other, and then the first shell 201 rotates with respect to the second shell 202. The preset direction may be a clockwise direction or a counterclockwise direction. The flexible part may be made of flexible glass, flexible metal or flexible rubber.

In the terminal 20, the axis of the rotation shaft 100 and the folding axis of the flexible screen 203 are coaxial to improve the integrity and reliability of the terminal 20.

In a specific example, in the case that the terminal 20 is a mobile phone for example, the mobile phone with a foldable screen usually includes the first part and the second part, which are foldable relative to each other. Usually the motherboard 800 is located on one of the two parts, for example, the motherboard 800 is on the first part. The first part includes the first shell 201, and the second part includes the second shell 202. The motherboard 800 is located in the first shell 201. Both the RF module 700 and the baseband module are located on the motherboard 800. Referring to a straight mobile phone with a hard screen, an antenna 600 and a switch related to the antenna 600 may be deployed in the first part or in the motherboard 800. With the application of 5G technology, the number of antennas increases significantly, and both the first part and the second part may be used as the carrier in antenna design. The rotation shaft body 120 includes the first rotating member 121 and the second rotating member 122. The first connection contact 110 is fixed on the first rotating member 121, the second connection contact 160 is fixed on the second rotating member 122, the first connection wire 200 is connected with the first connection contact 110, and the second connection wire 300 is connected with the second connection contact 160 to realize large angle bending of the two connection wires 200, 300. Each of the first connection wire 200 and the second connection wire 300 is formed by the coaxial cable. The first connection wire 200 and the second connection wire 300 may be customized according to needs and in a conformal design with the corresponding support plates.

The technical solutions provided in the embodiments of the present disclosure may have the following beneficial effects.

It can be seen from the above embodiments that the present disclosure effectively ensures the quality and stability of an RF signal of the antenna inside a terminal by dividing the RF connector into the first connection contact and the second connection contact and using the electrical connection between the first connection contact and the second connection contact. By rotationally connecting two connection wires through the rotation shaft, the antenna of a first part in a foldable terminal is connected to the motherboard of a second part, or the antenna of the second part in the foldable terminal is connected to the motherboard of the first part. Besides, the first connection wire and the second connection wire do not need to be folded.

The characteristics disclosed in several product embodiments provided in the present application may be combined randomly without conflict to obtain new product embodiments.

Other implementation solutions of the present disclosure will be apparent to those skilled in the art from consideration of the description and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A Radio Frequency (RF) connector, comprising:
   a rotation shaft, which comprises a first connection contact and a second connection contact, the first connection contact and the second connection contact forming rotation shaft structures which are rotatable relative to each other, and the first connection contact and the second connection contact forming an electrical connection;
   a first connection wire, which is connected with the first connection contact; and
   a second connection wire, which is connected with the second connection contact,
   wherein the rotation shaft further comprises a shielding shell, both the first connection contact and the second connection contact being located in the shielding shell.

2. The RF connector of claim 1, wherein the rotation shaft further comprises:
   a rotation shaft body, the first connection contact being arranged on a first rotating member of the rotation shaft body, and the second connection contact being arranged on a second rotating member of the rotation shaft body.

3. The RF connector of claim 1, wherein the shielding shell comprises:
   a first shielding shell arranged outside the first connection contact; and
   a second shielding shell arranged outside the second connection contact;
   the first shielding shell and the second shielding shell jointly form an accommodating space, and both the first connection contact and the second connection contact are located in the accommodating space.

4. The RF connector of claim 1, wherein the first connection contact comprises a connection bayonet;
   the second connection contact comprises a connection inner core;
   the connection inner core is arranged in the connection bayonet.

5. The RF connector of claim 4, wherein the connection inner core is cylindrical.

6. The RF connector of claim 1, wherein the first connection wire comprises coaxial wire, flexible printed circuit (FPC) wire, polyimide (PI) wire or liquid crystal polymer (LCP) wire;
   the second connection wire comprises coaxial wire, FPC wire, PI wire or LCP wire.

7. The RF connector of claim 1, wherein the shielding shell is made of an electrically conductive material.

8. A terminal, comprising a Radio Frequency (RF) connector, the RF connector comprising:
   a rotation shaft, which comprises a first connection contact and a second connection contact, the first connection contact and the second connection contact forming rotation shaft structures which are rotatable relative to each other, and the first connection contact and the second connection contact forming an electrical connection;
   a first connection wire, which is connected with the first connection contact; and
   a second connection wire, which is connected with the second connection contact,
   wherein the rotation shaft further comprises a shielding shell, both the first connection contact and the second connection contact being located in the shielding shell.

9. The terminal of claim 8, wherein the rotation shaft further comprises:
   a rotation shaft body, the first connection contact being arranged on a first rotating member of the rotation shaft body, and the second connection contact being arranged on a second rotating member of the rotation shaft body;
   the first rotating member is connected to a first support plate of the terminal, the second rotating member is connected to a second support plate of the terminal, and the first rotating member and the second rotating member drive the first support plate and the second support plate into rotation.

10. The terminal of claim 9, wherein,
    the first support plate comprises a first groove, and the first connection wire is arranged in the first groove;
    the second support plate comprises a second groove, and the second connection wire is arranged in the second groove.

11. The terminal of claim 9, further comprising:
    a first shell connected to at least one of the first rotating member or the first support plate, the first connection wire being located in the first shell;
    a second shell connected to at least one of the second rotating member or the second support plate, the second connection wire being located in the second shell; and
    a flexible screen, a back of the flexible screen is covered on the first shell, the second shell and the rotation shaft, and the flexible screen deforms with a rotation of the first shell relative to the second shell.

12. The terminal of claim 11, wherein the first shell is integral with the first support plate, or the first shell is separable from the first support plate;

the second shell is integral with the second support plate,
or the second shell is separable from the second support plate.

13. The terminal of claim 8, wherein the first connection wire is connected to an antenna, and the second connection wire is connected to an RF module; or
the first connection wire is connected to an RF module, and the second connection wire is connected to an antenna.

14. The terminal of claim 8, wherein the shielding shell is made of an electrically conductive material.

* * * * *